United States Patent
Yamaguchi et al.

(10) Patent No.: US 6,593,926 B1
(45) Date of Patent: Jul. 15, 2003

(54) MAP 3D-CONVERTER SYSTEM

(75) Inventors: Hiroshi Yamaguchi, Tokyo (JP);
Hiroshi Maruyama, Fukuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/473,993

(22) Filed: Dec. 29, 1999

(30) Foreign Application Priority Data

Jan. 6, 1999 (JP) .......................................... 11-001454

(51) Int. Cl.⁷ ............................................. G06T 15/10
(52) U.S. Cl. ..................................................... 345/427
(58) Field of Search ................................ 345/427, 418, 345/419, 420, 619, 679, 472

(56) References Cited

U.S. PATENT DOCUMENTS

| | | | | |
|---|---|---|---|---|
| 5,561,748 A | * | 10/1996 | Niu et al. ..................... | 345/420 |
| 5,668,939 A | * | 9/1997 | Numao et al. ............... | 345/427 |
| 6,169,552 B1 | * | 1/2001 | Endo et al. ................... | 345/427 |
| 6,215,493 B1 | * | 4/2001 | Fujita ........................... | 345/418 |
| 6,295,066 B1 | * | 9/2001 | Tanizaki et al. ............. | 345/419 |

FOREIGN PATENT DOCUMENTS

| | | |
|---|---|---|
| JP | 4-149681 | 5/1992 |
| JP | 4-293078 | 10/1992 |
| JP | 9-54544 | 2/1997 |
| JP | 9-331440 | 12/1997 |
| JP | 10-111882 | 4/1998 |
| JP | 10-283501 | 10/1998 |

* cited by examiner

*Primary Examiner*—Mark Zimmerman
*Assistant Examiner*—Huedung X. Cao
(74) *Attorney, Agent, or Firm*—Sughrue Mion, PLLC

(57) ABSTRACT

The map 3D-converter system for converting 2D maps into a 3D map, of the present invention, comprises: a 2D map data storage device for storing 2D map data with an attribute indicating that the 2D map data includes horizontal positions of the top view, or vertical positions of a side view; a 3D conversion instructor for specifying an identification value for identifying a target map and a reference position for developing the target map in a 3D space; a 3D converter for converting the 2D map data, read from the 2D map data storage device, into 3D map data, based on the identification value and the reference position specified by the 3D conversion instructor; and a 3D map data storage device for storing the 3D map data produced by the 3D converter.

17 Claims, 5 Drawing Sheets

MAP 3D-CONVERTER SYSTEM

BACKGROUND OF THE INVENTION

1. Field of the Invention

The present invention relates to 3D-conversion of a map, and in particular, to a system, method, and computer program for automatically converting 2D map data into a 3D map.

This application is based on Japanese Patent Application No. Hei 11-1454, the contents of which are incorporated herein by reference.

2. Description of the Related Art

A conventional system for 3D conversion is disclosed in Japanese Patent Application, First Publication No. Hei 10-111882. This 3D converter system comprises: a data reader for reading out 2D CAD data produced by a 2D CAD system; a figure assignor for assigning the extracted figures in at least two reference planes in a triaxial reference system; a outermost line extractor for extracting the outermost lines of the figures in the reference planes; a solid body producer for producing a solid body by expanding the outermost lines in the directions of the normal lines with respect to the reference planes; and a solid body synthesizer for producing 3D CAD data by synthesizing the solid bodies based on the 2D CAD data. This technique remarkably reduces the time required for production of the 3D CAD drawing from the 2D CAD drawing, and simplifies the input operation by a CAD operator.

Another conventional 3D converter system is disclosed in Japanese Patent Application, First Publication No. Hei 9-331440. This 3D converter system comprises: a projective transformation producer for producing projective transformations which associate coordinates in each 2D image with projective coordinates in a plane; a depth value producer for producing depth values representing distances between an imaging device and targets, based on the normalized projective transformation and on the projective coordinates of the targets of the 2D images; and a 3D coordinate producer for providing 3D scene information by producing 3D Euclidean coordinates of the targets, according to an equation with respect to 3D Euclidean coordinate axes in the reference plane or to the 3D Euclidean coordinate of the reference position, based on the projective transformation coordinates of the reference position and the target point and on the depth value of the target point. According to this conventional technique, when producing another 3D scene from a different point of view based on the same 2D image, an accurate 3D scene is obtained without the correction of the parameters for the imaging device.

However, in the above conventional techniques, the height data which is absent must be manually input or must be compensated with other 2D data. That is, the 3D data cannot be automatically obtained only from the 2D data which represents points on a map. Further, the data size of the stored 3D map data is increased because the 3D data requires more coordinate data than the 2D data.

As another conventional technique, Japanese Patent Application, First Publication No. Hei 4-149681 discloses a method for producing 3D data from the 2D image data and height information. Japanese Patent Application, First Publication No. Hei 4-293078 discloses a method for producing a 3D model from 2D contour map data by calculating heights from the 2D contour map. Japanese Patent Application, First Publication No. Hei 10-283501 discloses a method for detecting a building based on colors on the map read by a scanner.

Further, Japanese Patent Application, First Publication No. 9-54544 discloses a map display device which comprises a storage means for storing coordinates forming the flat shape of an object with height information, and a processor for producing a 3D image from the coordinates and the height information.

While the above conventional techniques produce the 3D image, these devices require the additional information such as the height information, which is not part of the existing data and must be additionally input. Further, the additional information increases the data size of the 3D image.

BRIEF SUMMARY OF THE INVENTION

It is therefore an object of the present invention to provide a system, method, and computer program for automatically converting 2D map data into a 3D map, which reduces the data size of the 3D map data, and naturally makes use of the existing hierarchical 2D map data to produce the 3D map data.

In a first aspect of the present invention, the map 3D-converter system for converting 2D maps into a 3D map, comprises: a 2D map data storage device for storing 2D map data with an attribute indicating that the 2D map data includes horizontal positions of the top view, or vertical positions of a side view; a 3D conversion instructor for specifying an identification value for identifying a target map and a reference position for developing the target map in a 3D space; a 3D converter for converting the 2D map data, read from the 2D map data storage device, into 3D map data, based on the identification value and the reference position specified by the 3D conversion instructor; and a 3D map data storage device for storing the 3D map data produced by the 3D converter.

In a second aspect of the present invention, in the invention presented in the first aspect, the 2D map data is associated with other 2D map data in a lower class in the 2D map data storage device.

In a third aspect of the present invention, in the invention presented in the first aspect, the 3D conversion instructor instructs the number of lower classes to be developed by the 3D conversion process.

In a fourth aspect of the present invention, the invention presented in the first aspect further comprises a 3D map data display for displaying 3D map data stored in the 3D map data storage device.

In a fifth aspect of the present invention, in the invention presented in the first aspect, the 3D conversion instructor comprises a device for receiving a 3D conversion request from a user, and the 3D converter converts the 2D map data into the 3D map data, based on the 3D conversion request input to the 3D conversion instructor.

In a sixth aspect of the present invention, a method is provided for converting 2D map data into a 3D map, comprising the steps of: storing 2D map data with an attribute indicating that the 2D map data includes horizontal positions of the top view, or vertical positions of a side view; specifying an identification value for identifying a target map and a reference position for developing the target map in a 3D space; converting the 2D map data into 3D map data, based on the identification value and the reference position; and storing the 3D map data in a 3D map data storage device.

In a seventh aspect of the present invention, in the invention presented in the sixth aspect, the stored 2D map data is associated with another 2D map data in a lower class.

In an eighth aspect of the present invention, the invention presented in the sixth aspect further comprises the step of instructing the number of lower classes to be developed by the 3D conversion process.

In a ninth aspect of the present invention, the invention presented in the sixth aspect further comprises a step of displaying 3D map data stored in the 3D map data storage device.

In a tenth aspect of the present invention, the invention presented in the sixth aspect further comprises steps of: receiving a 3D conversion request from a user; and repeating conversion of the 2D map data into the 3D map data, based on the input 3D conversion request.

In an eleventh aspect of the present invention, the program instructions in the computer readable medium perform: storing 2D map data with an attribute indicating that the 2D map data includes horizontal positions of the top view, or vertical positions of a side view; specifying an identification value for identifying a target map and a reference position for developing the target map in a 3D space; converting the 2D map data into 3D map data, based on the identification value and the reference position; and storing the 3D map data in a 3D map data storage device.

In a twelfth aspect of the present invention, in the invention presented in the eleventh aspect, the stored 2D map data is associated with another 2D map data in the lower class.

In a thirteenth aspect of the present invention, in the invention presented in the eleventh aspect, the program instructions include instructions for instructing the number of lower classes to be developed by the 3D conversion process.

In a fourteenth aspect of the present invention, in the invention presented in the eleventh aspect, the program instructions include instructions for displaying 3D map data stored in the 3D map data storage device.

In a fifteenth aspect of the present invention, in the invention presented in the eleventh aspect, the program instructions include instructions for: receiving a 3D conversion request from a user; and repeating conversion of the 2D map data into the 3D map data, based on the input 3D conversion request.

According to the present invention, because, based on the request sent from the 3D conversion instructor, only necessary data are read from the 2D map data storage device, and the 3D converter 22 performs the 3D conversion based on the information from the 2D map attribute data storage device. Thus, the 2D data, which represent the points on the map in the specified area, are automatically converted into the 3D data.

Because the coordinate data, which are used to produce the 3D map data, are stored as the 2D values in the 2D map data storage device, the map 3D conversion system advantageously reduces the data size for the 3D map information.

Because the data are read from the 2D map data storage device, and the 3D converter 22 performs the 3D conversion based on the information from the 2D map attribute data storage device, even the 2D map management system, which has the hierarchy structure associating a map with another map, naturally makes use of the existing hierarchical 2D map data to produce the 3D map data.

Because the invention avoids the display of an unnecessary map which is not requested by the user, the user easily reaches the target detailed map.

The process of the present invention is fast because the 3D conversion for unnecessary maps is avoided.

DETAILED DESCRIPTION OF THE INVENTION

[First Embodiment]

Figure 1:
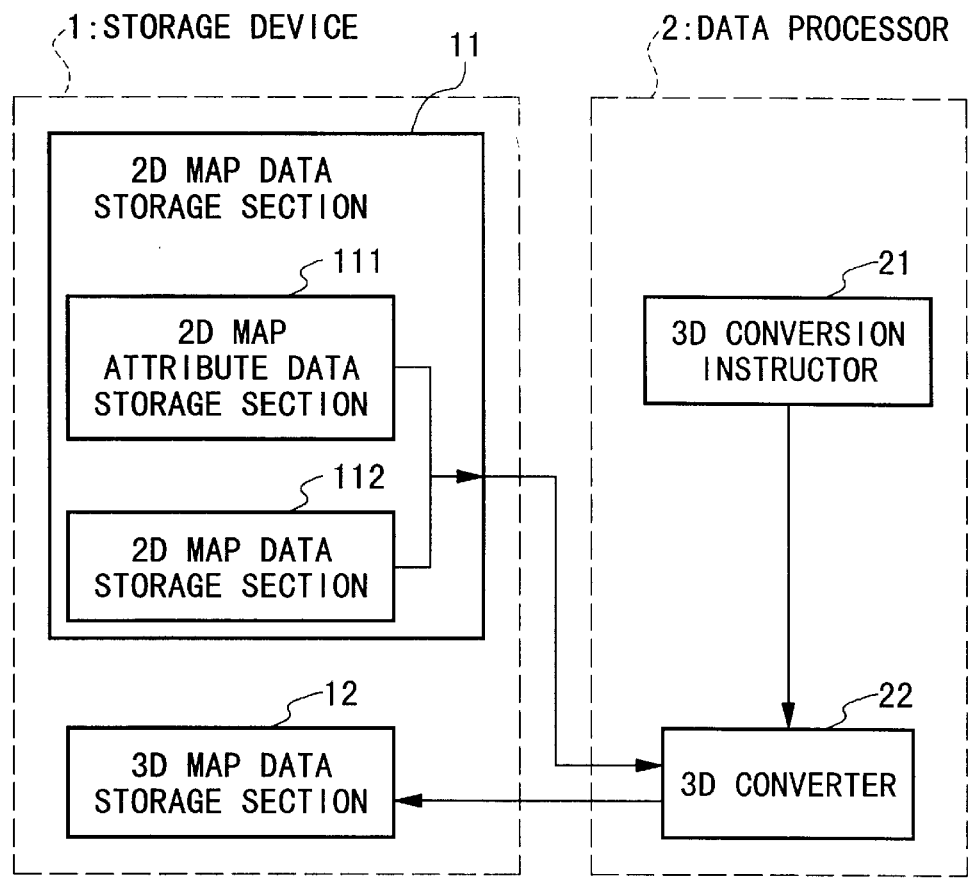
FIG. 1 is a block diagram showing the structure of the first embodiment of the present invention.

FIG. 1 is a block diagram showing the entire structure of the first embodiment of the invention. In this figure, the first embodiment comprises a storage device 1 for storing map data, and a data processor 2 which is operated under control of a computer program. The storage device 1 comprises a 2D (two-dimensional) map data storage section 11 for storing 2D map data, and a 3D (three-dimensional) map data storage section 12 for storing 3D map data. The 2D map data storage device 11 has a 2D map attribute data storage section 111, and a 2D map data storage section 112. The 2D map attribute data storage section 111 stores horizontal attributes when the map is a top view, or vertical attributes when the map is a side view. The 2D map data storage section 112 stores the coordinates of the map (2D map data).

The data processor 2 has a 3D conversion instructor 21, and a 3D converter 22. The 3D conversion instructor 21 supplies an identification value for identifying a map which is the target of conversion, and the coordinates of a reference position for developing the conversion target map, to the 3D converter 22, which then starts 3D conversion of the map data. Based on the identification value and the reference position supplied from the 3D conversion instructor 21, the 3D converter 22 converts the 2D map data into 3D map data, and supplies the result to the 3D map data storage section 12 of the storage device 1. That is, the data processor 2 reads the 2D map data from the 2D map data storage section 11, converts it into the 3D map data, and writes the result of the conversion in the 3D map data storage section 12.

The operation of the first embodiment will be explained in more detail with reference to FIGS. 1 to 3. Initially, the 3D conversion instructor 21 sends the identification value for identifying the conversion target map, and the reference position coordinates for developing the conversion target map, to the 3D converter 22 as a request (step SI in FIG. 2). The request may include the number of lower classes to be developed. Based on the received identification value, the 3D converter 22 reads the 2D map from the 2D map data storage section 112, and reads the attribute of the target map from the 2D map attribute data storage section 111 (step S2). Then, the flow proceeds to the 3D conversion process.

Figure 3:
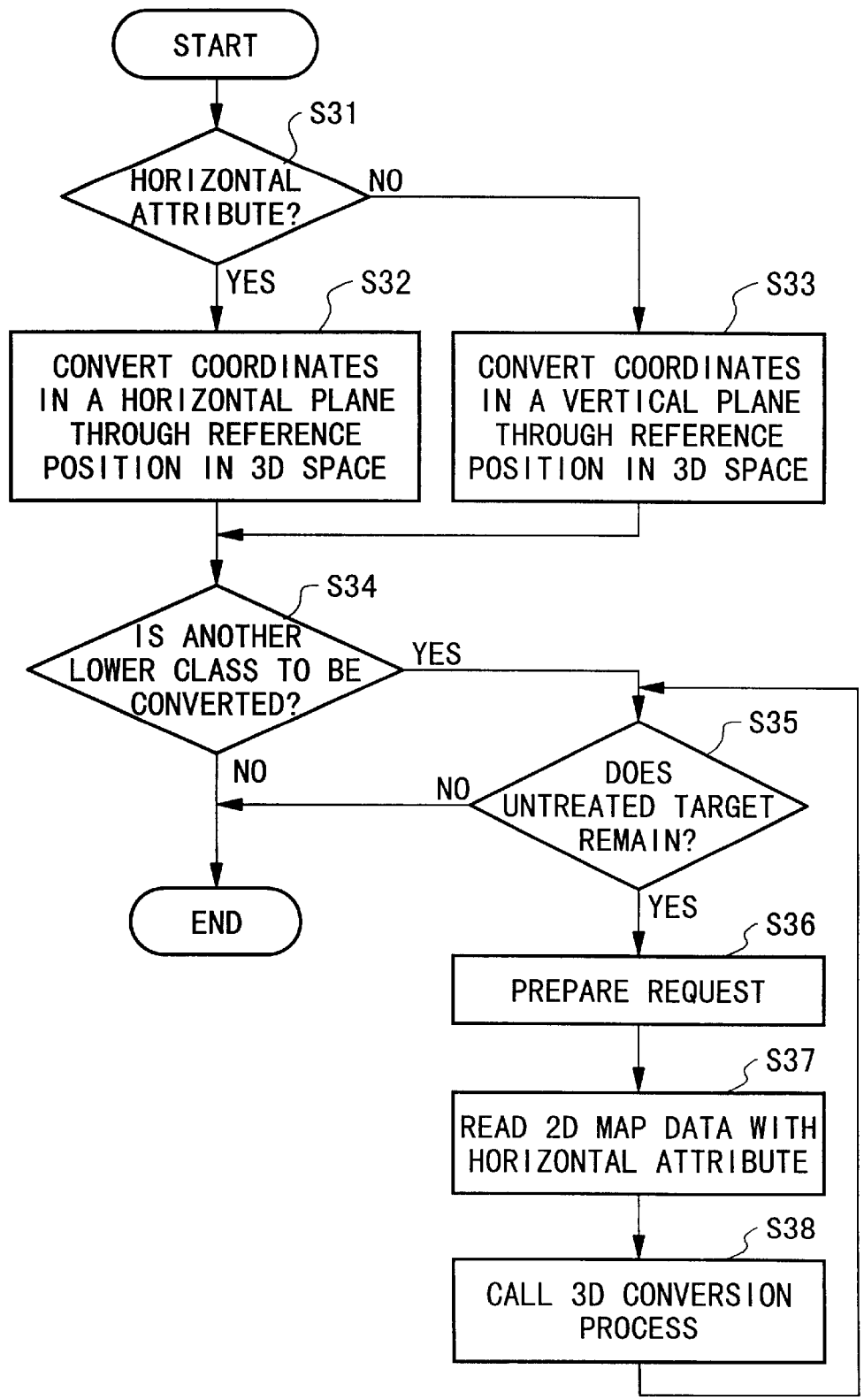
FIG. 3 is a flowchart showing the sub-process in the operation of the first embodiment of the present invention.

FIG. 3 is a flowchart showing the 3D conversion process in detail. Initially, the attribute of the read 2D map data is judged (step S31). When the attribute is horizontal, the coordinates of the 2D map data are developed in a horizontal plane (step S32). On the other hand, when the attribute is vertical, the data are developed in a vertical plane perpendicular to the horizontal plane (step S33). The attribute may not be necessarily horizontal or vertical, and may represent normal vector values in any direction.

Then, when there is another level to be developed, it is determined whether the lower level is to be developed (step S34). When the development is not necessary, the 3D conversion process is terminated. When the development is necessary, it is determined whether there is a target map at the lower level to be developed (step S35). When there is no target map, the 3D conversion process is terminated.

When there is another target map to be developed, the steps S35 to S38 are repeated for the target map at the next lower level. Based on the position of the target map, the identification value and the reference position are prepared as a request (step S36). When the system has another level to be developed, the number of the classes to be developed, which is set as the request, is decremented by one.

The 2D map data and the attribute corresponding to the identification value are read from the 2D map data storage section 112 and the 2D map attribute data storage section 111 (step S37), the 3D conversion process is commenced (step S38), and the above steps are repeated until the processes for all the maps in the lower classes are completed. When the 3D conversion process is completed, the 3D converter 22 writes the result into the 3D data storage section 12 (step S4 in FIG. 2).

According to the first embodiment, because, based on the request sent from the 3D conversion instructor 21, only necessary data are read from the 2D map data storage section 112, and the 3D converter 22 performs the 3D conversion based on the information from the 2D map attribute data storage section 111. Thus, the 2D data, which represents the positions on the map in the specified area, is automatically converted into the 3D data.

Because the coordinate data, which are used to produce the 3D map data, are stored as the 2D values in the 2D map data storage section 112, the map 3D conversion system reduces the data size for the 3D map information. In even the 2D map management system which stores the hierarchy structure associating a map with another map, the 3D conversion system naturally uses the existing hierarchical 2D map data to produce the 3D map data.

Figure 4:
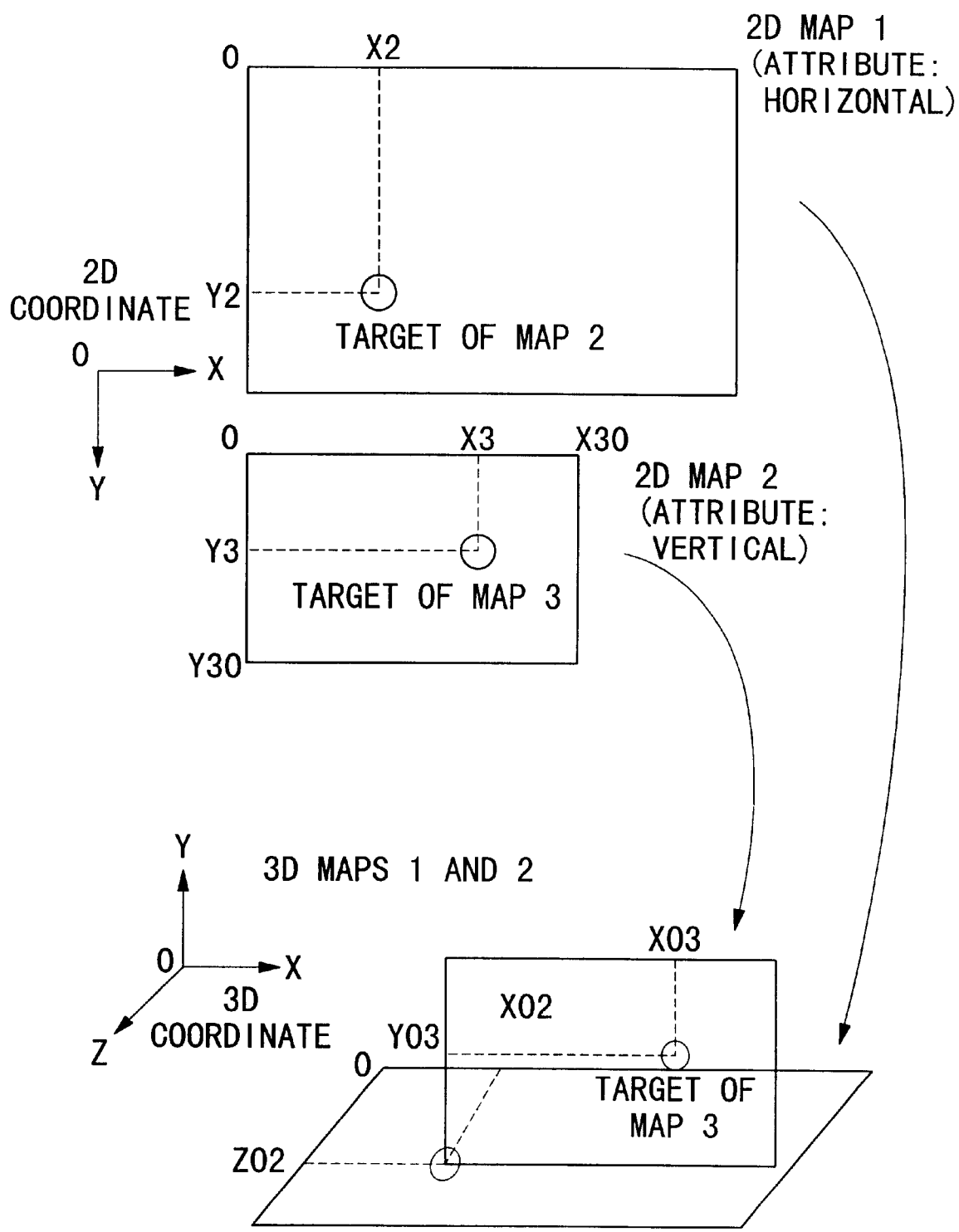
FIG. 4 is a diagram showing an example of the operation of the first embodiment of the present invention.

The operation of the embodiment will be specifically explained by way of an example. FIG. 4 is a schematic diagram for explaining the operation of the embodiment. In this figure, a 2D map 1 with the horizontal attribute is assumed. The coordinate position (X2, Y2) on the map 1 is associated with a map 2 with the vertical attribute in the next lower class of the map 1. The coordinate position (X3, Y3) on the map 2 is associated with a map 3 in the next lower class of the map 2.

The map 1 and the map 2 which belongs to the next lower class are to be 3D-converted. Here, the reference position (X01, Y01, Z01) in the 3D space based on the map 1 is the origin O, that is, (0, 0, 0).

Figure 2:
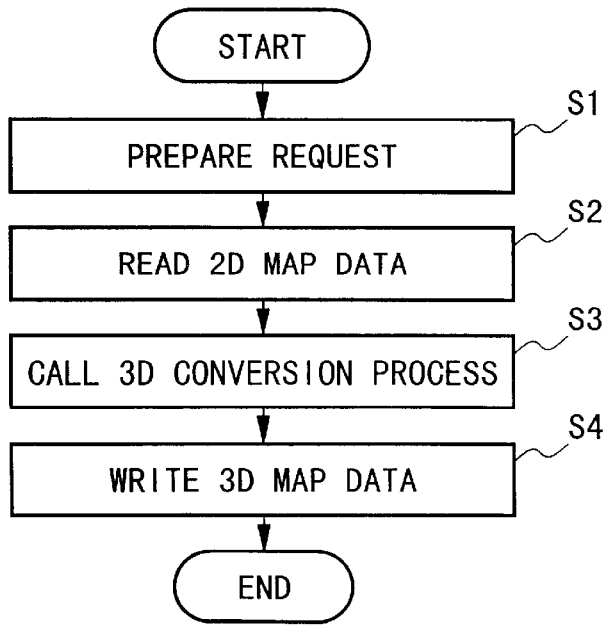
FIG. 2 is a flowchart showing the main process in the operation of the first embodiment of the present invention.

The 3D conversion instructor 21 supplies "map 1", which is the identification value for the conversion target, and the reference position (0, 0, 0), which is the reference coordinate for development, as the request to the 3D converter 22 (step S1 in FIG. 2). Further, the request includes "2", which is the number of lower classes to be developed. Based on the received identification value, the 3D converter 22 reads the 2D map data corresponding to the identification value "map 1" from the 2D map data storage section 111, and reads its attribute from the 2D map attribute data storage section 112 (step S2). Then, the flow proceeds to the 3D conversion process.

The read 2D map attribute is judged (step S31 in FIG. 3). Because this attribute is horizontal, the coordinates in the 2D map data of the map 1 are developed in the horizontal plane (step S32) so that the position (X, Y) corresponds to (X01+X, Y01, Z01+Y). Accordingly, the position (X2, Y2) on the map 2 is converted into (X02, Y02, Z02), which corresponds to (0+X2, 0, 0+Y2), that is, (X2, 0, Y2).

Because the number of development classes, which is 2, is above "1", it is determined that there is another lower class to be developed (step S34). Then, it is determined whether in the lower class there is a target to be developed (step S35). Because the map 2 is the target to be developed, the verification value "map 2" and the reference position "(X02, Y02, Z02)=(X2, 0, Y2)" are prepared as a request (step S36). Here, the number of classes to be developed is decremented by one, that is, is set to "2−1=1."

Then, the 2D map data and its attribute, corresponding to the identification value "map 2", are read from the 2D map data storage section 112 and the 2D map attribute data storage section 111 (step S37), and the 3D conversion process is called again (step S38). After the completion of the second 3D conversion process, the above process is repeated until the development for all the target maps in the further lower classes is completed. In this example, there is no map other than the map 2, the loop of the 3D conversion process in FIG. 3 is ended just when the call for the second 3D conversion process is completed. The 3D converter 22 writes the result of the 3D conversion for the map 1 and the maps in the lower classes in the 3D map data storage section 12.

The process for calling the second 3D conversion will be explained in more detail. The attribute of the read 2D map is judged (step S31). In this example, because the attribute is vertical, the coordinates of the 2D map data are developed in a vertical plane (step S32). The coordinates with the vertical attribute are converted so that the position (X, Y) on the 2D map is associated with (X02+X, Y02+Y30−Y, Z02). Accordingly, the target (X3, Y3) on the map 3 is converted into (X03, Y03, Z03), which corresponds to (X2+X03, 0+Y30−Y03, Y2). It is then determined that the further lower class is not developed because the number of classes to be developed is 1 (not above 1) (step S34), and the second 3D conversion process is ended, at which point the flow returns to the first 3D conversion process.

[Second Embodiment]

Figure 5:
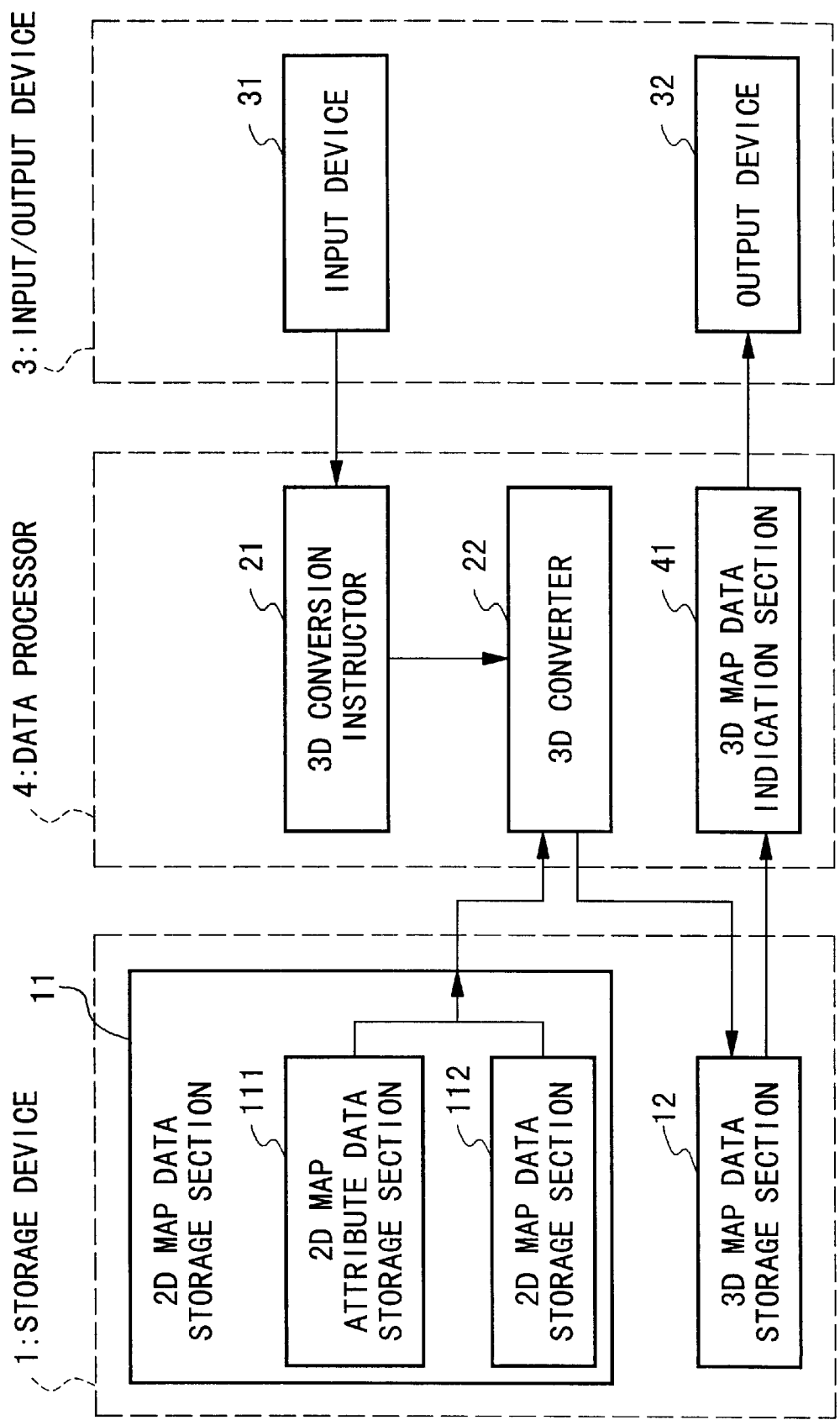
FIG. 5 is a block diagram showing the second embodiment of the present invention.

The second embodiment of the present invention will be explained below. FIG. 5 is a block diagram showing the map 3D converter system of the second embodiment. The second embodiment comprises a storage device 1 for storing map data, a data processor 4 which is operated under control by a computer program, and an input and output device 3 for inputting a user request and displaying map data. The storage device 1 comprises a 2D map data storage section 11 for storing 2D map data, and a 3D map data storage section 12 for storing 3D map data. The 2D map data storage section 11 has a 2D map attribute data storage section 111, and a 2D map data storage section 112. The 2D map attribute data storage section 111 stores horizontal attribute when the map is a top view, or vertical attribute when the map is a side view. The 2D map data storage section 112 stores the coordinates of the map.

The input/output device 3 comprises an input device 31 and an output device 32. The output device 32 displays a 3D map based on the 3D map data, under control by a 3D map data indication section 41 of the data processor 4. The input device 31 receives a request to develop the target map, which is input by the user, based on the 3D map displayed on the output device 32, and supplies the request to the 3D conversion instructor 21. That is, this system allows the user, who confirms the 3D map displayed on the output device 32, to instruct the development of a part of the 3D map.

The data processor 4 comprises a 3D conversion instructor 21, a 3D converter 22, and a 3D map data indicator 41. The 3D conversion instructor 21 receives an identification value for identifying the map which is the target of the conversion, and coordinates of a reference position for developing the target map, from the input/output device 3, and sends them to the 3D converter 22, which then starts the 3D conversion. Based on the identification value, the 3D converter 22 reads out the target 2D map data from the 2D map data storage section 11, converts them into 3D map data based on the reference position, and writes the result of the conversion in the 3D map data storage section 12. To display the 3D map prepared by the 3D converter 22 and stored in the 3D map data storage section 12, the 3D map data indicator 41 supplies the 3D map data corresponding to a specified area (e.g., an area selected by the user) to the output device 32. Thus, the data processor 2 communicates with the user through the input/output device 3 to display the 3D map from the 2D map data in the storage device 1.

The entire operation of the second embodiment is the same as the operation of the first embodiment in which the number of classes to be developed is always one. Further, in parallel to this operation, the embodiment receives from a user a request indicating which unprocessed target map is to be 3D-converted and to be displayed on the 3D map on the output device 32, and displays the 3D map from the 2D map data in the next lower class according to the request.

When converting the 2D map data in the hierarchy structure into the 3D map, the second embodiment has, in addition to the advantages of the first embodiment, the advantage in that, because the embodiment avoids the development of an unnecessary map which is not requested by the user, the user easily reaches the target detailed map. Further, the process is fast because the 3D conversion for unnecessary maps is avoided.

[Third Embodiment]

Figure 6:
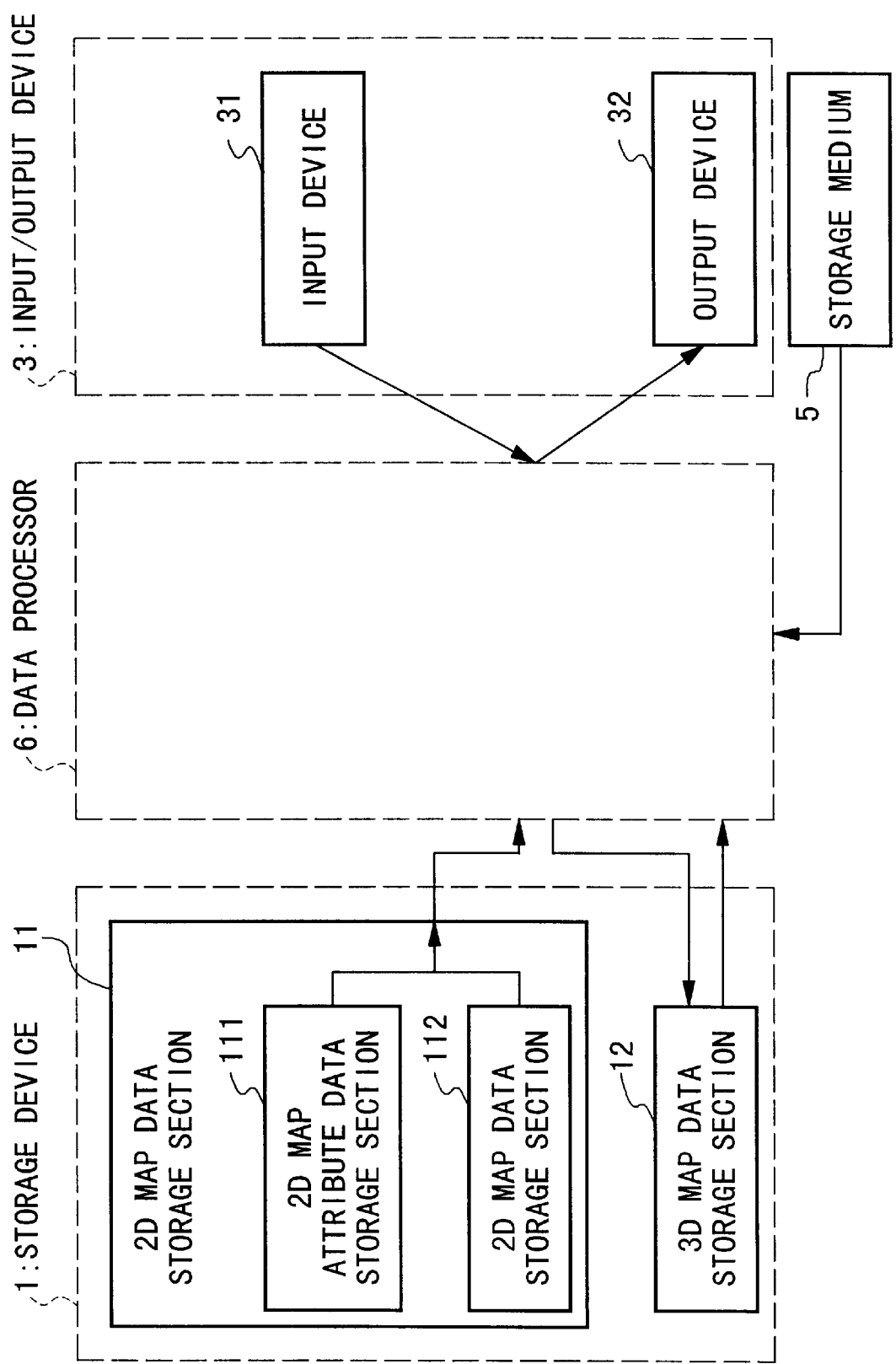
FIG. 6 is a block diagram showing the third embodiment of the present invention.

The third embodiment of the present invention will be explained. FIG. 6 is a block diagram showing the structure of the map 3D converter system of the third embodiment. In this figure, the third embodiment comprises a storage medium 5 which stores the 3D conversion program. The storage medium 5 may be a magnetic disc, a semiconductor memory, or another storage medium. The 3D conversion program is read from the storage medium 5 by the data processor 6, and controls the entire operation of the data processor 6. The data processor 6 performs the process under the control of the 3D conversion program in a manner similar to the data processors 2 and 5 of the first and second embodiments.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A map 3D-converter system for converting 2D maps into a 3D map, comprising:

a 2D map data storage device for storing 2D map data with an attribute indicating that the 2D map data includes horizontal positions of the top view, or vertical positions of a side view;

a 3D conversion instructor for specifying an identification value for identifying a target map and a reference position for developing the target map in a 3D space, the reference position for the target map being different from a second reference position specified for a second target map;

a 3D converter for converting the 2D map data, read from said 2D map data storage device, into 3D map data, based on the identification value and the reference position specified by said 3D conversion instructor; and a 3D map data storage device for storing the 3D map data produced by said 3D converter.

2. A system according to claim 1, wherein, in said 2D map data storage device, said 2D map data is associated with another 2D map data in the lower class.

3. A system according to claim 1, wherein said 3D conversion instructor instructs the number of lower classes to be developed by the 3D conversion process.

4. A system according to claim 1, further comprising a 3D map data display for displaying 3D map data stored in said 3D map data storage device.

5. A system according to claim 1, wherein said 3D conversion instructor comprises a device for receiving a 3D conversion request from a user, and said 3D converter converts the 2D map data into the 3D map data, based on the 3D conversion request input to said 3D conversion instructor.

6. A method for converting 2D map data into 3D map, comprising steps of:

storing 2D map data with an attribute indicating that the 2D map data includes horizontal positions of the top view, or vertical positions of a side view;

specifying an identification value for identifying a target map and a reference position for developing the target map in a 3D space, the reference position for the target map being different from a second reference position specified for a second target map;

converting the 2D map data into 3D map data, based on the identification value and the reference position; and storing the 3D map data in a 3D map data storage device.

7. A method according to claim 6, wherein said stored 2D map data is associated with another 2D map data in the lower class.

8. A method according to claim 6, further comprising a step of instructing the number of lower classes to be developed by the 3D conversion process.

9. A method according to claim 6, further comprising a step of displaying 3D map data stored in said 3D map data storage device.

10. A method according to claim 6, comprising the steps of:

receiving a 3D conversion request from a user; and repeating conversion of the 2D map data into the 3D map data, based on the input 3D conversion request.

11. A computer readable medium containing program instructions for converting 2D map data into 3D map, the program instructions including instructions for performing the steps comprising:

storing 2D map data with an attribute indicating that the 2D map data includes horizontal positions of the top view, or vertical positions of a side view;

specifying an identification value for identifying a target map and a reference position for developing the target map in a 3D space, the reference position for the target map being different from a second reference position specified for a second target map;

converting the 2D map data into 3D map data, based on the identification value and the reference position; and storing the 3D map data in a 3D map data storage device.

12. A computer readable medium according to claim 11, wherein said stored 2D map data is associated with another 2D map data in the lower class.

13. A computer readable medium according to claim 11, wherein said program instructions include instructions for instructing the number of lower classes to be developed by the 3D conversion process.

14. A computer readable medium according to claim 11, wherein said program instructions include instructions for displaying 3D map data stored in said 3D map data storage device.

15. A computer readable medium according to claim 11, wherein said program instructions include instructions for:
   receiving a 3D conversion request from a user; and
   repeating conversion of the 2D map data into the 3D map data, based on the input 3D conversion request.

16. A 3D map converting system, comprising:
   means for storing a first 2D map data with an attribute indicating that said first 2D map data includes one of horizontal positions of a top view and vertical positions of a side view;
   means for specifying a target map and a first reference position for developing the target map in a 3D space;
   means for converting said first 2D map data into 3D map data, based on said reference position;
   means for associating, by a second reference position that is specified different from the first reference position, second 2D map data of an another 2D map with said first 2D map data; and, means for storing said 3D map data.

17. The system of claim 16, further comprising means for instructing the number of lower classes to be developed by the 3D conversion system.

* * * * *